J. KUNCUS.
DRAFT DETACHING DEVICE.
APPLICATION FILED JULY 23, 1919.
1,342,119.
Patented June 1, 1920.
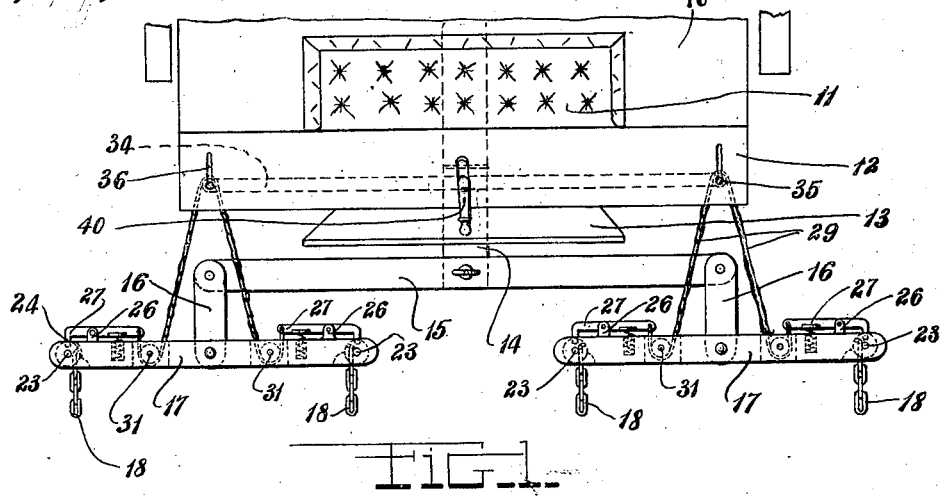
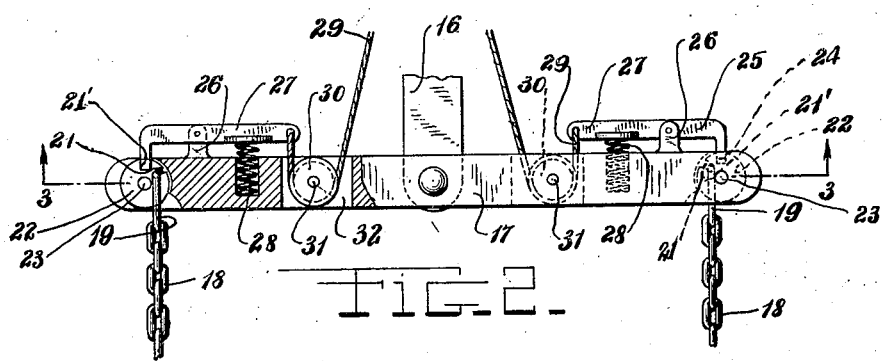
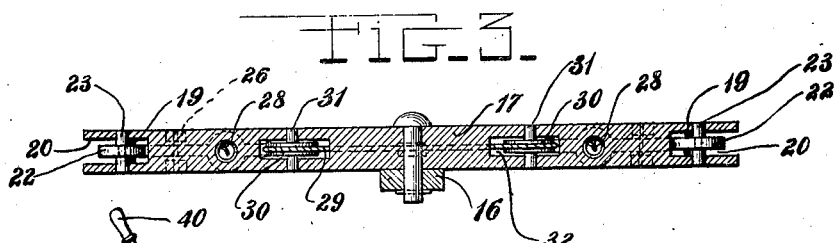
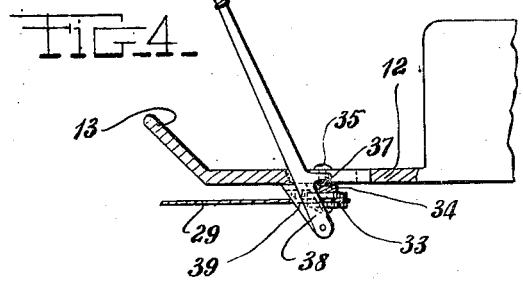
Inventor
Joseph Kuncus
By Adam E Schatz
Attorney

UNITED STATES PATENT OFFICE.

JOSEPH KUNCUS, OF CHICAGO, ILLINOIS.

DRAFT-DETACHING DEVICE.

1,342,119.  Specification of Letters Patent.  Patented June 1, 1920.

Application filed July 23, 1919. Serial No. 312,745.

*To all whom it may concern:*

Be it known that I, JOSEPH KUNCUS, a citizen of Russia, residing at 540 So. Maxwell Str., Chicago, county of Cook, and State of Illinois, have invented certain new and useful Improvements in Draft-Detaching Devices, of which the following is a specification.

This invention has as its object the provision of means whereby one or more animals used in drawing a vehicle may be freed from the same by the movement of a single lever under the control of the driver so as to prevent possible damage should the animals become unmanageable.

This object is attained by the novel construction and combination of parts hereinafter described, and shown in the accompanying drawings, forming a material part of this disclosure, and in which—

Figure 1 is a top plan view showing a portion of a conventional type of vehicle and indicating the application of the invention.

Fig. 2 is an enlarged top plan view showing one of the detaching devices in detail.

Fig. 3 is a longitudinal sectional view taken on line 3—3 of Fig. 2, and

Fig. 4 is a sectional view taken through the front part of the vehicle and indicating the control means by which the device is operated.

Referring to the drawings in detail, the numeral 10 designates the front part of a vehicle, the same being provided with a seat 11 contiguous to the platform 12, from which extends a dash-board 13.

Secured below the body of the vehicle and extending out at the front is a central draw-bar 14 having pivotally mounted in its outer end, in advance of the dash-board, an equalizing beam 15, connected by pivotal links 16 with the whiffle trees 17, to which the animals are attached by means of traces, straps or chains 18 as indicated.

The chains 18 are not however directly connected with the ends of the whiffle trees, but terminate in links 19, passing into open recesses 20, formed in the ends of the whiffle trees, and engage in slots 21, formed radially in the peripheral edges of disks 22, pivoted upon pins 23, and rotatable in the ends of the whiffle trees.

These disks also contain other slots 21', arranged radially in the periphery at about 30 degrees from the slots 21, and entering into the last named slots 21', are hook detents 24, these detent elements being formed with the short ends 25 of levers freely pivoted upon rearwardly extending lugs 26 of the whiffle trees 17, long ends 27 of the levers being normally pressed outward by coiled compression springs 28, partially contained within recesses formed in the rear sides of the whiffle trees.

Engaged with the extremities of the long arms 27 of the levers are cords 29, passing freely over grooved pulleys 30, mounted to rotate upon pins 31, passing through recesses 32, formed in the whiffle trees, while the other ends of the cords 29 pass over similar grooved pulleys 33, pivotally mounted upon the ends of a bar 34, supported by pins 35, movable in longitudinally disposed slots 36, formed near the outer edges of the platform 12, while engaged centrally on the bar 34, is a lug 37 formed with the lever 38, pivoted in a bracket 39, extending down from the platform at the center thereof, the upper end 40 of the lever being adapted for manual operation and under the immediate control of the driver.

Should it be desired to detach the animals at any time it can be accomplished by operating the lever 40, drawing it rearwardly, the transverse, longitudinal bar 34 thus moved to the rear, carrying the pulleys 33 and stressing the cords 29, operating the levers carrying the detents 24 so as to move the same from the openings 21' permitting the disks 32 to rotate by reason of the pull of the traces, which are off center or tangent to the center of their rotation, as can best be seen in Fig. 2, the vehicle being held by brakes or other devices as may be desired when the team is released.

Having thus described my invention what I claim as new and desire to secure by Letters Patent, is—

1. In a draft detaching device, the combination with a beam extending outwardly from the center of a vehicle, a cross beam pivoted thereon, links engaged in the ends of said cross beam, whiffle trees pivoted to the forwardly extending ends of said links, slotted disks carried in the ends of said whiffle trees, certain of said slots being arranged to receive the draft traces, lever detents pivotally mounted at the rear of said whiffle trees, said detents being engageable in the other slots, pulleys rotatably mounted in said whiffle trees, a transverse bar movable longitudinally of the vehicle, pulleys carried in the ends of said transverse bar, cords extending from said levers over said pulleys, and a central lever engaged with said transverse bar whereby all of said cords are drawn simultaneously and said detent removed from said disk allowing the traces to become free.

2. In a draft detaching device, the combination with an equalizing beam and a pair of whiffle trees hingedly engaged at the ends thereof, of a bar disposed transversely below the front of the vehicle, a pair of pulleys carried at the ends of said bar, similar pulleys pivoted in recesses formed in the body of said whiffle trees, levers extending oppositely at the rear of said whiffle trees, detents formed with the inner ends of said levers, slotted disks rotatably mounted in the ends of said whiffle trees, one of the slots in said disks being adapted to receive the mentioned detents and the other slots the traces by which the draft animals are connected, cords passing over said pulleys engaged with said levers and means for actuating said transverse bar whereby said detents are withdrawn from the slots.

In testimony whereof I have affixed my signature.

JOSEPH KUNCUS.